United States Patent [19]

Morris

[11] 4,138,129
[45] Feb. 6, 1979

[54] VEHICLE WHEEL WELL SKIRT

[75] Inventor: William D. Morris, South Bend, Ind.

[73] Assignee: American Formed Plastics Corp., Elkhart, Ind.

[21] Appl. No.: 809,610

[22] Filed: Jun. 24, 1977

[51] Int. Cl.² .......................... B60R 13/04; B62B 9/16
[52] U.S. Cl. ............................ 280/152 R; 280/153 R
[58] Field of Search ......... 280/152 R, 153.5, 154.5 R, 280/154, 160, 762, 153 R; 293/1, 62, 71 R; 296/28 A, 28 M, 28 K

[56] References Cited
U.S. PATENT DOCUMENTS

| 2,161,837 | 6/1939 | Tell | 280/152 |
| 3,065,724 | 11/1962 | Tritt | 293/71 R |
| 4,015,760 | 4/1977 | Bott | 293/1 |

Primary Examiner—Joseph F. Peters, Jr.
Assistant Examiner—Donn McGiehan
Attorney, Agent, or Firm—Oltsch, Knoblock & Hall

[57] ABSTRACT

A skirt secured to a vehicle wheel well and having a channel part through which fasteners extend to connect the skirt to the peripheral edge of the wheel well. A deformable flexible tape is applied over the fasteners within the channel part of the skirt to hide the fasteners from exterior view.

3 Claims, 3 Drawing Figures

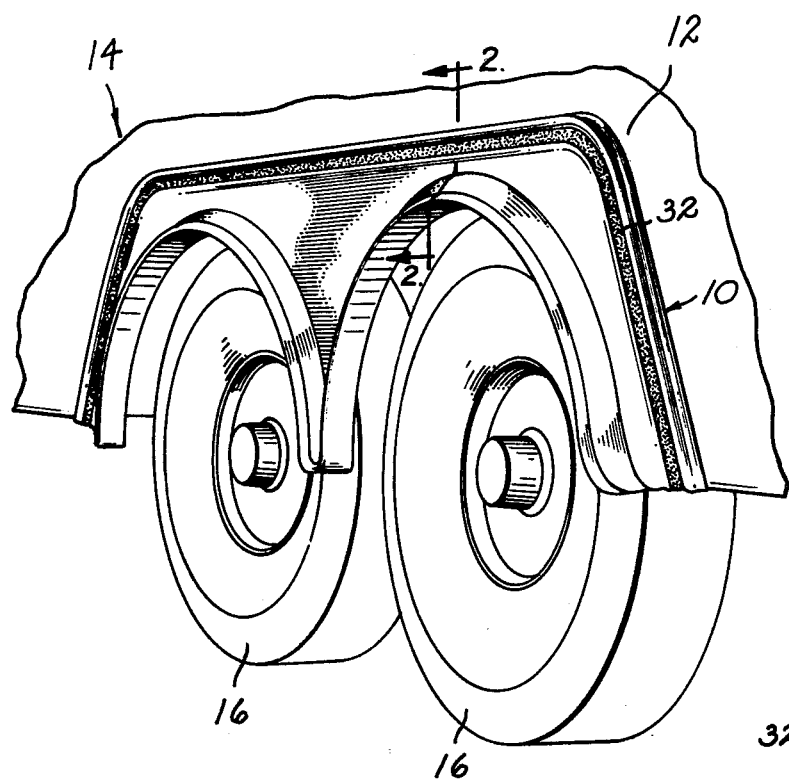
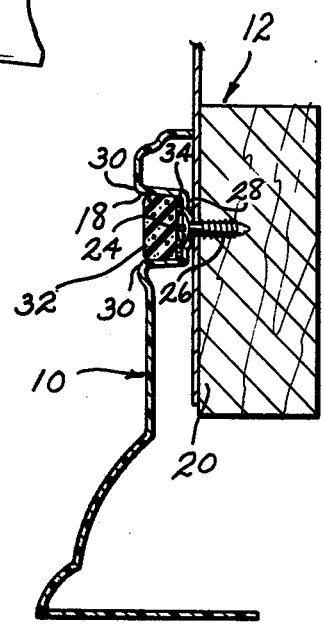
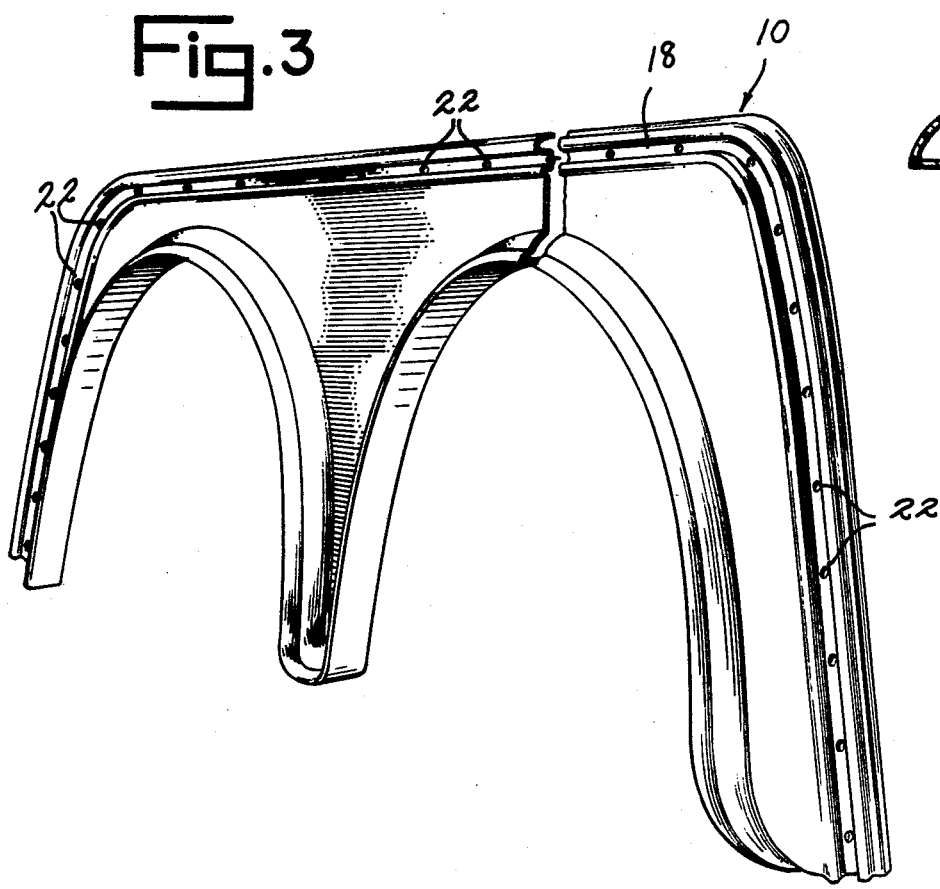

VEHICLE WHEEL WELL SKIRT

SUMMARY OF THE INVENTION

This invention relates to a combination wheel well and fender skirt and will have particular application to the manner in which a fender skirt is attached to the peripheral edge of the wheel well of a vehicle.

The fender skirt of this invention includes a channel part which when the skirt is applied against the vehicle extends along and overlies an edge portion of its wheel well. A plurality of fasteners extend through the skirt channel part and into the wheel well peripheral edge portion to secure the skirt to the wheel well. A deformable, flexible cellular tape is applied over the fasteners within the channel part of the fender skirt to hide the fasteners from exterior view.

Accordingly, it is an object of this invention to provide a combination wheel well and attached fender skirt in which the skirt is attached to the wheel well by hidden fasteners.

Another object of this invention is to provide a fender skirt which is attached to a wheel well by means of fasteners over which is applied a deformable, flexible tape which serves to hide the fasteners from exterior view.

Still another object of this invention is to provide a fender skirt which is attached to a wheel well by fasteners extending through a channel part in the fender skirt and over which is applied a deformable, flexible tape which serves as a decor component of the skirt.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of a skirt mounted to a vehicle wheel well.

FIG. 2 is a cross sectional view taken along line 2—2 of FIG. 1.

FIG. 3 is a view of the skirt component of this invention with the parts thereof shown in separated form for illustration.

DESCRIPTION OF THE PREFERRED EMBODIMENT

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

In FIG. 1 skirt 10 is shown connected to wheel well 12 of vehicle 14. While wheel well 12 is illustrated as accommodating dual wheels 16, it is to be understood that this invention would have equal application to a single wheel-accommodating wheel well.

Skirt 10 which may be of a molded plastic or formed metal construction includes a channel part 18. Channel part 18 extends about the upper periphery of skirt 10 and is designed to generally follow the peripheral edge portion 20 of wheel well 12. Fasteners 22, each having a head 24 and a shank 26, are utilized to secure skirt 10 to the peripheral edge portion 20 of wheel well 12. Fasteners 22 protrude through the base 28 of channel part 18 at selectively spaced intervals along the channel part with shank 26 of each of the fasteners extending into the peripheral edge portion 20 of the wheel well. The illustrated fasteners 22 have threaded shanks 26 which enable the shanks to be turned into wheel well 12. In other embodiments of this invention the fastener may have a straight, unthreaded shank which will allow the fastener to be driven directly into the peripheral edge portion of the wheel well. Head 24 of each fastener 22 overlies a portion of the base 28 of skirt channel part 18 and is inset below the level of the outer edges 30 of the channel part.

Tape 32 is applied over heads 24 of fasteners 22 within skirt channel part 18. Tape 32 is of the deformable, flexible type having a cellular form, preferably of the closed cell or sponge type, which enables heads 24 of fasteners 22 to protrude into and deform the inner surface of the tape when the tape is applied to skirt channel part 18. In the preferred embodiment an adhesive 34 is carried by tape 32 and serves to secure the tape to channel part 18 along its base 28, overlying fastener heads 24. The thickness of tape 32 is approximately equal to the depth of channel part 18 so that with the tape applied to the channel part the upper surface of the tape will be generally flush with outer edges 30 of the channel part. Tape 32 may be of a variety of colors which enables the tape not only to hide fastener heads 24 from exterior view but also to serve as a decor component for skirt 10.

It is to be understood that the invention is not to be limited to the details above given, but may be modified within the scope of the appended claims.

What I claim is:

1. The combination of a wheel well having a peripheral edge portion and a fender skirt comprising a channel part formed in said skirt extending along and overlying said edge portion of the wheel well, a plurality of fasteners each having a shank and enlarged head, the shank of said fasteners extending through said skirt within the channel part thereof and into said wheel well edge portion at spaced intervals to secure said skirt to said wheel well with the heads of said fasteners overlying said skirt at its channel part, a strip of deformable flexible cellular tape fitted within said channel part and overlying said fastener heads, means securing said tape to said channel part with the fastener heads deforming said tape whereby said tape in conjunction with said channel part hides said fasteners from exterior view.

2. The combination wheel well and fender skirt of claim 1 wherein said tape securing means is a bonding agent applied between said tape and said channel part.

3. The combination wheel well and fender skirt of claim 2 wherein said fastener heads are inset from the outer edges of said channel part, said tape having a thickness approximately equal to the depth of said channel part and being sufficiently deformable to accommodate said fastener heads with the outer surface of said tape being generally flush with said outer edges of the channel part.

* * * * *